United States Patent [19]

Isono et al.

[11]  4,268,857
[45]  May 19, 1981

[54] BEAM INDEX COLOR TELEVISION RECEIVER APPARATUS

[75] Inventors: Katsuo Isono, Kawagoe; Tomoyoshi Imayasu, Urawa, both of Japan

[73] Assignee: Sony Corporation, Tokyo, Japan

[21] Appl. No.: 103,092

[22] Filed: Dec. 12, 1979

[30] Foreign Application Priority Data

Dec. 14, 1978 [JP] Japan .................. 53-155114

[51] Int. Cl.³ ............................................. H04N 9/24
[52] U.S. Cl. .................................................... 358/67
[58] Field of Search .............................. 358/66, 67, 69

[56] References Cited

U.S. PATENT DOCUMENTS 3,522,370  7/1970  Jones et al. ........................... 358/67

FOREIGN PATENT DOCUMENTS 1063043  3/1967  United Kingdom .

Primary Examiner—Robert L. Richardson
Attorney, Agent, or Firm—Lewis H. Eslinger; Alvin Sinderbrand

[57] ABSTRACT

In a beam index color television receiver of the type having a cathode ray tube which is provided with beam-excitable color elements and index elements disposed on a display screen of the cathode ray tube and which are scanned by an electron beam; color switching is controlled by an index signal generator, comprised of a photo-detector and band-pass filter, for generating a periodic index signal as the index elements are scanned by the beam, color gates which sequentially gate respective color control signals individually to modulate the electron beam as the beam scans the color elements, a gating signal circuit including a phase-locked loop which generates sequential gating signals at a frequency synchronized with the frequency of the periodic index signal and a gate pulse generator which supplies the gating signals in sequence to the color gates to control the latter so as to gate the respective color control signals, and a phase-controlling circuit for imparting a phase shift to the gating signals supplied to the gating pulse generator to compensate for an inherent time delay caused by the photo-detector, band-pass filter and phase-locked loop. Such phase shift may be imparted by a phase shifter connected between the phase-locked loop and the gate pulse generator or at a voltage controlled oscillator in the phase-locked loop itself.

12 Claims, 24 Drawing Figures

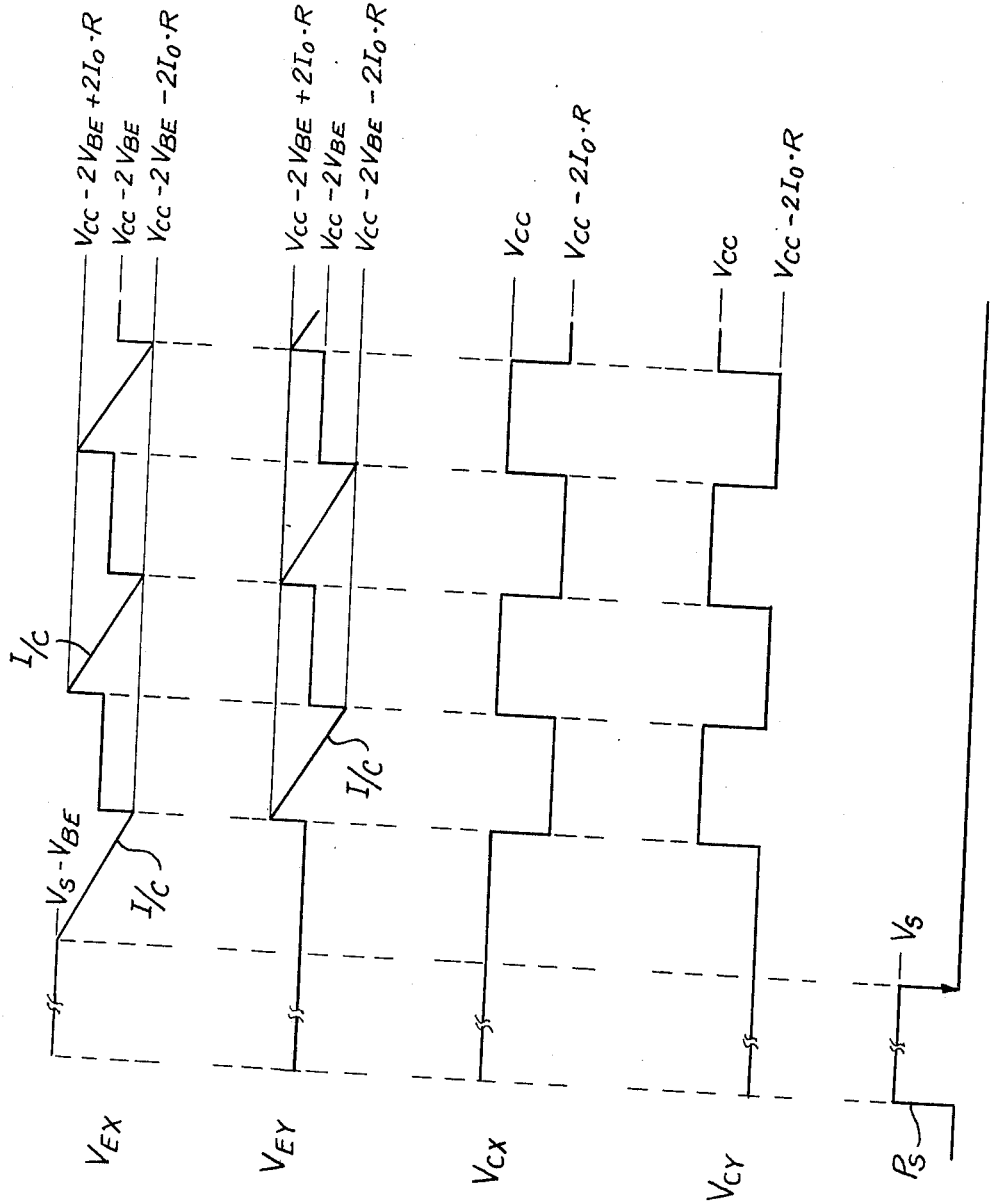

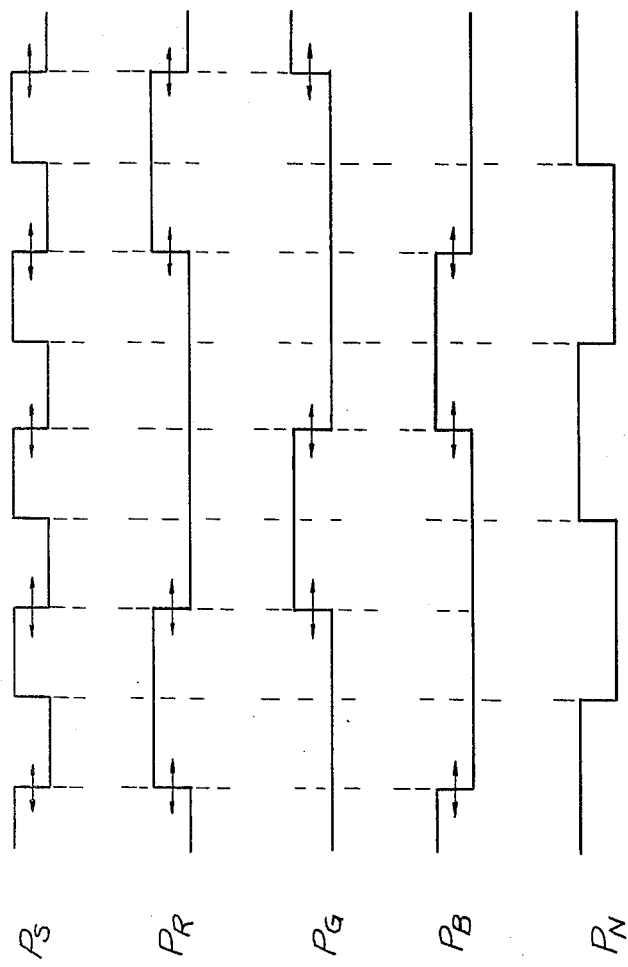
FIG.9A $P_S$
FIG.9B $P_R$
FIG.9C $P_G$
FIG.9D $P_B$
FIG.9E $P_N$
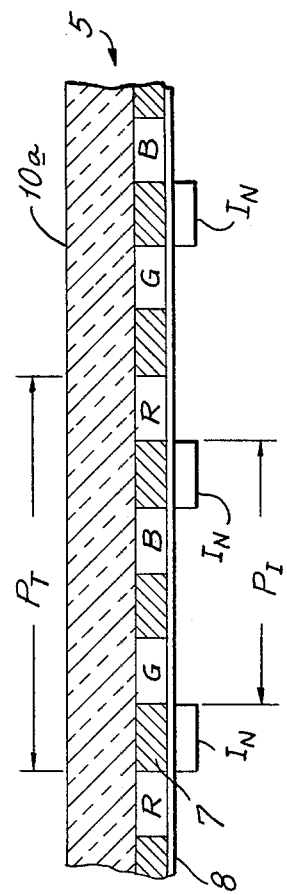
FIG.10

BEAM INDEX COLOR TELEVISION RECEIVER APPARATUS

BACKGROUND OF THE INVENTION

This invention relates generally to beam index color television receivers and, more particularly, is directed to a circuit for controlling the color switching in a beam index color television receiver.

Beam index color television receivers are known wherein the display screen of the cathode ray tube has periodic index stripes in addition to the usual beam-excitable color elements, such as, red (R), green (G) and blue (B) phosphor stripes. The phosphor stripes, as is conventional, are arrayed in RGB triads, repetitively across the display screen so as to be scanned by the electron beam as the latter effects a horizontal scan in, for example, left-to-right traverse. As the electron beam scans the color phosphor stripes, it also scans the index stripes which, typically, also are phosphor stripes which emit light when excited by the scanning electron beam. In order to prevent light from the scanned index stripes from interfering with the displayed television picture, the index stripes are disposed on one surface of a thin metal layer which is thinly coated, as by vapor deposition, over the entire rear surface of the display screen, and the color phosphor stripes are disposed on the opposite surface of this thin metal layer, which layer is substantially transparent to the scanning electron beam but blocks the light which is emitted by the phosphor index stripes. A photo-detector responds to the light from each excited phosphor index stripe to produce a periodic signal whose frequency is equal to the frequency at which the phosphor index stripes are scanned. This periodic signal is then supplied to a band-pass filter so that, as the electron beam scans a horizontal line across the display screen, the photo-detector and band-pass filter generate a periodic index signal.

An example of a beam index color television receiver is disclosed in U.S. patent application Ser. No. 06/054,490 filed July 3, 1979, having a common assignee herewith.

The index signal which is derived from the scanning of the aforementioned phosphor index stripes is used to provide gating signals by which red, green and blue color control signals are gated onto, for example, the first grid of the cathode ray tube in repeated sequence. Since the index signal is derived from the scanning of the electron beam, the frequency of the index signal is related to the scanning velocity of that beam. Thus, the gating of the respective color control signals, referred to as color switching, desirably is synchronized with the beam velocity. This means that when the beam moves into scanning alignment with, for example, a red phosphor element, the red control signal is gated so as to modulate the beam with red signal information. Then, as the beam moves into proper scanning alignment with the green phosphor element, the red control signal is interrupted and the green control signal is gated so as to modulate the beam. Similarly, when the beam next moves into proper scanning alignment with a blue phosphor element, the green control signal is interrupted and the blue control signal is gated to modulate the beam. The foregoing gating sequence is repeated so that, as the beam scans the red, green and blue phosphor elements, it is concurrently and synchronously modulated with the red, green and blue color information.

In a beam index color television receiver of the above-described type, red, green and blue gates are provided for the red, green and blue color information signals, respectively, and each of these red, green and blue gates is opened individually and in sequence as the beam scans a horizontal line such that the respective color control signals are gated in time correspondence with the position of the beam at a color phosphor stripe that is associated with the gated color control signal. Typically, in such apparatus, for the purpose of obtaining color switching, that is, controlling the operations of the red, green and blue gates, the index signal from the band-pass filter is supplied to a phase-locked loop (PLL) circuit which is operative to provide a signal synchronized with the index signal and having a frequency twice that of the index signal. In the absence of time delays, as hereinafter referred to, the PLL circuit thus provides that, if the index signal undergoes a change in frequency due to, for example, a change in the scanning velocity of the electron beam caused by non-linearity of the horizontal deflection system, the red, green and blue gates nevertheless will be opened at the proper times, that is, at the times that the beam moves into proper scanning alignment with the red, green and blue phosphor elements, respectively.

However, the phase-locked loop, along with the photo-detector and band-pass filter, suffer from an inherent time delay. Thus, when there is a change in the scanning velocity there will be a small time delay until that change is reflected in the output of the phase-locked loop. This time delay can cause errors in the color switching synchronization, that is, the red, green and blue gates may open at slightly delayed times relative to the beam scanning of the respective color phosphor stripes. In other words, as a result of such time delay, when the electron beam is modulated by a particular one of the color control signals, the electron beam landing spot may be shifted from its desired position on the respective color phosphor stripe which is to be scanned. Since adjacent color phosphor stripes are separated by a black material formed of, for example, carbon or the like, the delay in phase of the color control signal may cause the electron beam landing spot to be shifted so as to overlap the adjacent black material or, in an extreme case, the next adjacent color phosphor stripe. This reduces the size of the landing spot on the respective color stripe with a resultant change in hue and a decrease in color saturation and relative luminance of the reproduced video image.

One apparatus which controls the electron beam in a beam index color television receiver so as to compensate for this time delay is described in the above-mentioned commonly assigned U.S. Patent Application. In this apparatus, a fixed delay or phase-shift circuit, which functions as a time adjustment circuit, is connected between the output of a voltage-controlled oscillator in the phase-locked loop circuit and the input of a phase comparator also in the phase-locked loop circuit. The voltage-controlled oscillator supplied an oscillating signal to the phase comparator through a frequency divider, so that a frequency-divided oscillating signal which is suitably delayed is fed back to the phase comparator for phase comparison with the index signal from the bandpass filter. In such apparatus, the time delay of the delay circuit is made to approximate the aforementioned time delay of the apparatus, so as to compensate therefor. However, the time delay of the apparatus may vary in accordance with changes in the scanning velocity of the electron beam and hence may not be accurately compensated for with a fixed delay circuit.

OBJECTS AND SUMMARY OF THE INVENTION

Accordingly, it is an object of this invention to provide improved apparatus for controlling color switching in a beam index color television receiver so as to avoid the above-described difficulties encountered with the prior art.

More particularly, it is an object of this invention to provide an apparatus for controlling color switching in a beam index color television receiver and in which the color switching is made to correspond with scanning of the respective color phosphor stripes by the electron beam, regardless of any time delay in the circuitry by which color switching is controlled from the index signal.

Another object of this invention is to provide apparatus for controlling color switching in a beam index color television receiver, and in which gate pulse signals used for gating respective color control signals have their phases changed in response to the level of a signal supplied to a voltage-controlled oscillator of the phase-locked loop circuit.

In accordance with an aspect of this invention, color switching control apparatus is provided for a beam index color television receiver of the type having a cathode ray tube which is provided with a display screen having beam-excitable color elements to be scanned by the electron beam as the latter is modulated by color control signals, and index elements which are scanned by the beam as the latter scans the display screen: such color switching control apparatus comprising means for generating an index signal in response to the scanning of the index elements by the beam; gating means for sequentially switching respective color control signals individually for modulating the electron beam as the beam scans respective ones of the color elements; and means for generating gating pulses in response to the index signal and for supplying the gating pulses to the gating means so as to cause the latter to switch the respective color control signals, the last mentioned means including a voltage-controlled oscillator for producing first pulses of a frequency synchronized with the index signal in response to a control voltage which varies with changes in the frequency of the index signal and which is applied to the oscillator means, and means for varying the phase of the first pulses in response to variations in the control voltage.

Preferably, the means for generating and supplying the gating pulses includes a phase-locked loop having the voltage-controlled oscillator therein for producing the first pulses at a frequency synchronized with the frequency of the index signal and the phase-locked loop further includes a low-pass filter which supplies the control voltage to the oscillator for controlling the production of the first pulses therefrom. In accordance with one embodiment of this invention, the means for varying the phase of the first pulses includes a phase-shifter receiving the first pulses from the voltage-controlled oscillator and also having the control voltage from the low-pass filter supplied thereto for controlling the amount of phase shift imparted to the first pulses. In accordance with another embodiment of this invention, the voltage-controlled oscillator in the phase-locked loop itself imparts the phase shift to the first pulses and includes two inputs, in which one input receives the control voltage from the low-pass filter for controlling the frequency of the first pulses and the other input also receives the control voltage from the low-pass filter for controlling the amount of phase shift imparted to the first pulses.

The above, and other objects, features and advantages of the invention, will be apparent in the following detailed description of illustrative embodiments of the invention which is to be read in connection with the accompanying drawings.

BRIEF DESCRIPTION OF THE DRAWINGS

FIG. 3 is a graphical diagram illustrating the inherent phase shift imparted by the embodiments shown in FIGS. 1 and 2;

FIGS. 8A–8E are waveform diagrams to which reference will be made in describing the operation of the voltage-controlled oscillators shown in FIGS. 5 and 6;

FIGS. 9A–9E are waveform diagrams to which reference will be made in describing the operation of the embodiment shown in FIG. 2; and FIG. 10 is a schematic cross-sectional representation of a portion of the display screen of a cathode ray tube that can be used in a beam index color television receiver according to this invention.

DETAILED DESCRIPTION OF THE PREFERRED EMBODIMENTS

Figure 1:
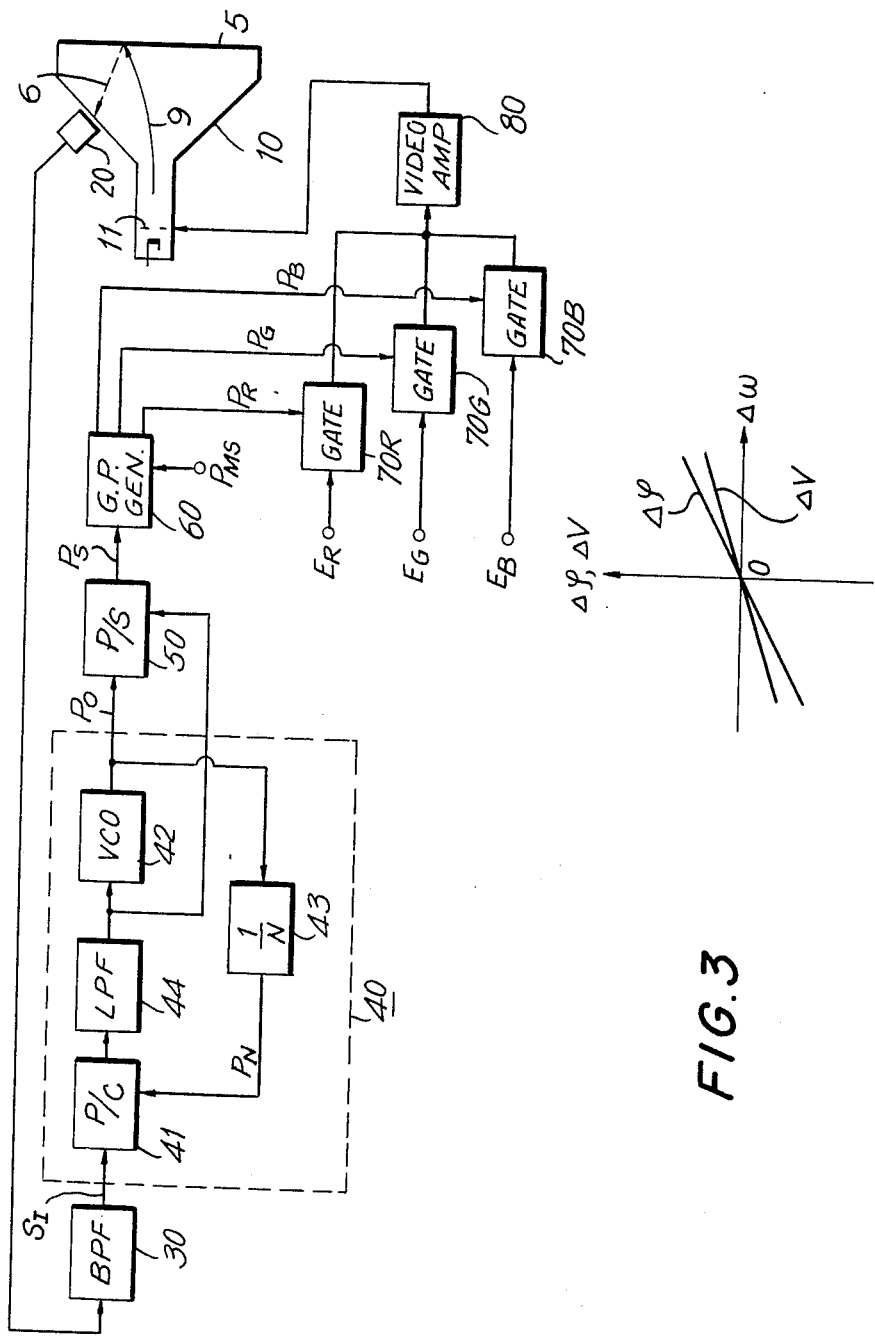
FIG. 1 is a block diagram of a first embodiment of an apparatus according to this invention for controlling color switching in a beam index color television receiver.

Referring to the drawings in detail, and initially to FIG. 1 thereof, it will be seen that, in a beam index color television receiver according to the present invention, a single beam cathode ray tube 10 is provided with a display screen 5 having triads of red, green and blue color phosphor elements, R, G and B, respectively (FIG. 10). As is known, each phosphor element emits light of a respective color when excited by a scanning electron beam, with the intensity of the light emitted thereby being determined by the intensity of the impinging beam. The triads of vertically extending phosphor elements or stripes R, G and B exhibit a pitch $P_T$ and repeat in the horizontal scanning direction of the beam, in the order RGBRGBRGB . . . Adjacent color phosphos elements are separated by bands 7 of a black material, for example, of carbon or the like. The bands 7 of black material and the color phosphor elements R, G and B are provided on the back or inner surface of the usual glass face place or panel 10a of tube 10.

A metallic layer 8, for example, of aluminum, is thinly coated, as by vapor deposition, over the entire rear surface of screen 5 so as to be effective as a light reflector while being substantially transparent to electrons. Thus, the electron beam 9 can penetrate metallic layer 8 to excite color phosphor stripes R, G and B, while light emitted from the color phosphor stripes as a result of such excitation is, for the most part, reflected foward toward the viewer rather than being directed into the color cathode ray tube 10.

Index phosphor stripes or elements $I_N$ extend vertically on the back surface of metallic layer 8 at locations spaced apart horizontally over the area of the screen. The index stripes or elements $I_N$ are arranged in predetermined positional relationships to the color phosphor stripes R, G and B. For example, in the illustrated embodiment, the pitch or spacing $P_I$ between the index elements $I_N$ is selected to be two-thirds the pitch $P_T$ of the triads of red, green and blue phosphor stripes, R, G and B, with the index elements $I_N$ being located between the adjacent red, green and blue phosphor stripes R, G and B.

As the electron beam scans the display screen 5, index elements $I_N$ are excited to emit light, but this light cannot pass through reflected metal layer 8 and, therefore, does not interfere with the color television picture which is produced by exciting the color phosphor elements as the beam scans successive horizontal lines. Thus, a viewer perceives a color video picture without undesired interference due to the light emitted by the excitation of index elements $I_N$.

In the illustrated beam index color television receiver of FIG. 1, red, green and blue primary color signals $E_R$, $E_G$ and $E_B$ are selectively applied through switching or gate circuits 70R, 70G and 70B, respectively, to a first grid 11 of tube 10 by which the beam current of electron beam 9 is controlled as the latter scans the respective color phosphor stripes R, G and B. It will be assumed that the color television receiver of FIG. 1 includes conventional circuitry (not shown) by which the red, green and blue color control, or information, signals $E_R$, $E_G$ and $E_B$, respectively, are derived from a received composite color television signal. It also is assumed that conventional beam deflection apparatus (not shown) is provided to deflect the electron beam for scanning a conventional raster across display screen 5. Gate circuits 70R, 70G and 70B, may comprise an analog gating device which is conditioned to gate, or transmit, analog signals, that is, the color control signals, which are applied thereto when gating pulse signals $P_R$, $P_G$ and $P_B$, respectively, are applied to coincidence with the respective analog signals. The gating signals $P_R$, $P_G$ and $P_B$ are phase shifted by 120° relative to each other so as to sequentially open the respective gate circuits to allow passage of primary color signals $E_R$, $E_G$ and $E_B$ in sequence as electron beam 9 scans the respective color phosphor stripes R, G and B, with the result that the primary color signals are synchronously applied to grid 11 of tube 10. Thus, when gate circuit 70R is enabled by gating pulse signal $P_R$, this gate circuit is opened so as to transmit the red color control, or information, signal $E_R$. Similarly, when gate circuit 70G is enabled by gating pulse signal $P_G$, this gate circuit is opened to transmit the green color control, or information, signal $E_G$. Finally, when gate circuit 70B is enabled by gating pulse signal $P_B$, gate circuit 70B opens to transmit the blue color control, or information, signal $E_B$. The outputs of gate circuits 70R, 70G and 70B are connected in common to a video amplifier 80 which, in turn, supplies the gated color control, or information, signals to grid 11. Thus, the red, green and blue primary color control signals $E_R$, $E_G$ and $E_B$ are transmitted from the gate circuits in regular succession to appear as a sequence of color control signals, which are then supplied through video amplifier 80 to first grid 11 of cathode ray tube 10 for density modulating electron beam 9 as the latter scans the red, green and blue stripes R, G and B, respectively.

A photo-detector 20, disposed at the outside of the funnel-shaped portion oq the envelope of color cathode ray tube 10, is adapted to receive light which is emitted by each index element $I_N$ when the latter is excited by the electron scanning beam. Thus, as the electron beam 9 scans each index element $I_N$, the resulting light 6 emitted from the index element is detected by photo-detector 20 which produces a corresponding output signal applied to a bandpass filter 30. The filter 30 is designed to pass an index signal $S_I$ in a frequency band determined by the pitch $P_I$ between the adjacent index elements $I_N$ and the scanning speed of electron beam 9.

Referring to FIG. 1, it will be seen that, for the purpose of obtaining color switching, that is, controlling the operations of the switching or gate circuits 70R, 70G and 70B, in the beam index color television receiver, index signal $S_I$ from bandpass filter 30 is supplied to a phase-locked loop (PLL) circuit 40 which is operative to provide a signal $P_O$ (FIG. 7A) synchronized with the index signal $S_I$ and having a frequency twice that of the index signal. Phase-locked loop circuit 40 may include a voltage-controlled oscillator 42 providing oscillation pulses with a central frequency which is approximately twice the frequency of the index signal $S_I$, and which are frequency divided by two in a frequency divider 43. The resulting frequency divided pulses $P_N$ from frequency divider 43 are fed to a phase comparator 41 to be phase compared therein with the index signal $S_I$ from band-pass filter 30. The resulting compared error voltage from the phase comparator 41 is applied through a low-pass filter 44 to voltage-controlled oscillator 42 which produces the pulses $P_O$ phase locked to twice the frequency of index signal $S_I$.

Figure 5:
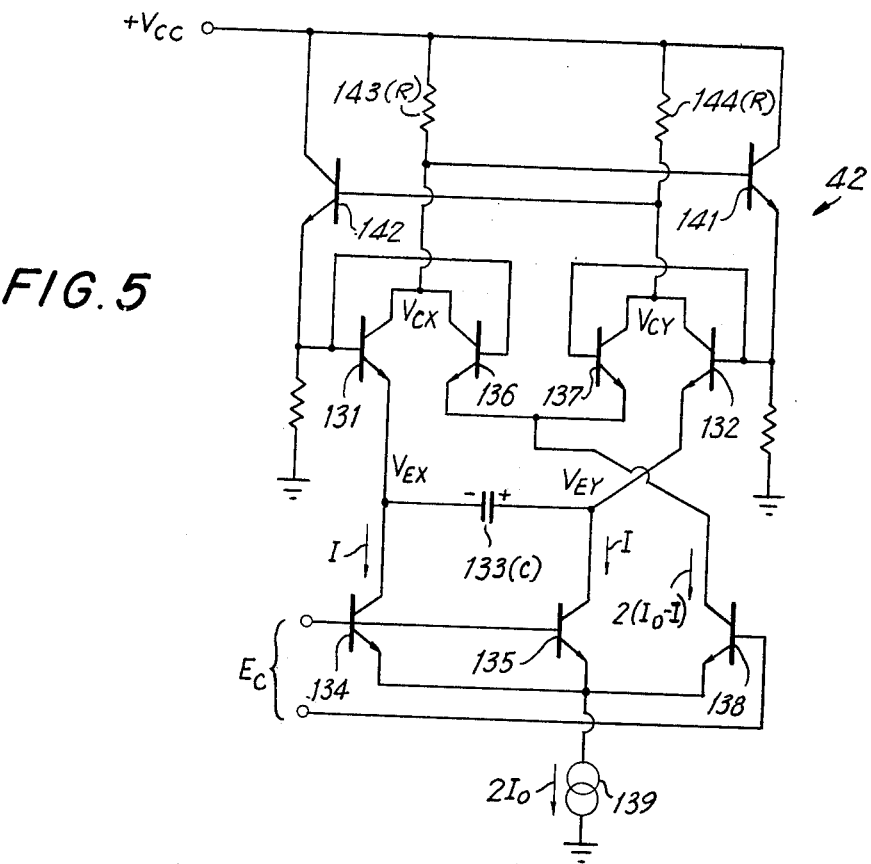
FIG. 5 is a circuit wiring diagram of a voltage-controlled oscillator that may be used in a phase-locked loop circuit of FIG. 1.

Referring now to FIG. 5, there is shown a voltage-controlled oscillator (VCO) 42 which can be utilized in phase-locked loop circuit 40 of FIG. 1. VCO 42 is shown to be formed from a pair of emitter coupled multi-vibrators including a first pair of transistors 131 and 136 having their collectors and bases connected together and a second pair of transistors 132 and 137 also having their collectors and bases connected together, and in which the collectors of each pair of transistors are connected to a voltage source $+V_{CC}$ through resistors 143 and 144, respectively, each having a resistance value R. The emitters of transistors 136 and 137 are directly connected together, and the emitters of transistors 131 and 132 are connected together through a capacitor 133 having a capacitance C. Transistors 136 and 137 have their emitters connected to the collector of a transistor 138 and the emitters of transistors 131 and 132 are connected to the collectors of transistors 134 and 135, respectively, which transistors 134 and 135 have a common base. The emitters of transistors 134, 135 and 138 are connected together and connected to ground through a constant current source 139 which generates a current $2I_O$. A control voltage $E_C$ from low-pass filter 44 on FIG. 1 is applied between the common base of transistors 134 and 135 and the base of transistor 138. Further, transistors 131 and 136 have their common base connected to the emitter of a transistor 142 which has its collector also connected to power supply $+V_{CC}$, while the base of transistor 142 is connected to the collectors of transistors 132 and 137. The common base of transistors 132 and 137 is, in like manner, connected to the emitter of a transistor 141 which also has its collector connected to power supply $+V_{CC}$ and its base connected to the collectors of transistors 131 and 136.

If the power supply voltage has a value $+V_{CC}$, the base-emitter forward voltage drop of each transistor is $V_{BE}$, the capacitance of capacitor 133 is C, the current generated by constant current source 139 is $2I_O$, the resistance value of each of load resistors 143 and 144 is R, and the current through each of transistors 134 and 135 is I (since the current through transistor 134 is equal to that through transistor 135), then, the emitter potentials $V_{EX}$, $V_{EY}$ and collector potentials $V_{CX}$, $V_{CY}$ of transistors 131 and 132, respectively, are varied as shown in FIGS. 8A-8D. That is, at the instant when transistors 131 and 136 turn ON, transistors 132 and 137 turn OFF. At this time, transistor 131 develops at its emitter terminal, a potential $V_{EX}$ having a value $V_{CC}-2V_{BE}$, and transistor 132 develops at its emitter terminal, a potential $V_{EY}$ having a value $V_{CC}-2V_{BE}+2I_O \cdot R$. Thus, the charged voltage across capacitor 133 equals $2I_O \cdot R$ having a polarity as shown in FIG. 5. Thereafter, the sum 2i of the currents flowing through transistors 134 and 135 flows through transistor 131, since transistor 132 is turned OFF. This means that, since the currents through transistors 134 and 135 are equal, a current I flows from the emitter of transistor 131, through capacitor 133, to the collector of transistor 135. As a consequence thereof, the emitter potential $V_{EY}$ of transistor 132 is reduced at a rate determined by the slope having a value I/C, where I is the current flowing through capacitor 133 and C is the value of the capacitance thereof. This means that a current $2(I_O-I)$ flows through transistors 138 and 136, resulting in a current of $2I_O$ flowing through load resistor 143. When the voltage across capacitor 133 reaches a value $2I_O \cdot R$ with a polarity opposite to that shown in FIG. 5, transistors 132 and 137 turn ON, and transistors 131 and 136 turn OFF. This is due to the positive feedback loop of transistors 132, 137, 142 and 131, 136. The foregoing operation is then repeated with the current flowing from the emitter of transistor 132 to transistor 134 through capacitor 133 and so on. Therefore, the oscillation frequency of VCO 42 can be determined from the value of I/C, and since the current I flowing through transistors 134 and 135 can be regulated by control voltage $E_C$, the oscillation frequency can accordingly be changed.

Referring back to FIG. 1, the oscillating pulses $P_O$ from VCO 42, which are phase-locked to the filtered index signal and have a frequency that is twice the frequency of the index signal, are fed to a gate pulse generator 60 through a phase shifter 50. For the purpose of the present discussion, it is sufficient to state merely that gate pulse generator 60, after being set or synchronized with the movement of the electron beam at the commencement of a horizontal scan, by means of a mode set pulse $P_{MS}$ suitably applied thereto, generates successive 3-phase gating pulse signals $P_R$, $P_G$ and $P_B$, at a frequency of one-third the frequency of pulses $P_O$ from phase-locked loop circuit 40, that is, two-thirds the frequency of index signal $S_I$, with the pulses $P_R$, $P_G$ and $P_B$ being sequentially displaced in phase by 120°, as shown on FIGS. 7D, 7E and 7F, respectively. Gating pulse signals $P_R$, $P_G$ and $P_B$ are supplied to gate circuits 70R, 70G and 70B, respectively to enable the gate circuits to pass therethrough the red, green and blue primary color control signals $E_R$, $E_G$ and $E_B$, respectively, as previously discussed.

However, as previously discussed, PLL circuit 40, bandpass filter 30 and photo-detector 20 impart a phase or time delay to the index signal $S_I$ and to the resulting pulses $P_O$ when there is a change in the scanning velocity of the electron beam, which delay may result in color misalignment and a consequent change in hue and color saturation of the displayed video image on display screen 5. To compensate for such phase delay, the present invention controls the phase shifter 50 interposed between phaselocked loop circuit 40 and gate pulse generator 60 for altering the phase of the oscillating pulse signal $P_O$ supplied to gate pulse generator 60. For effecting such control of phase shifter 50, a control signal $E_L$ from low-pass filter 44 of PLL circuit 40 is supplied to phase shifter 50 and varies the amount of phase shift imparted to oscillating pulse signal $P_O$.

Figure 4:
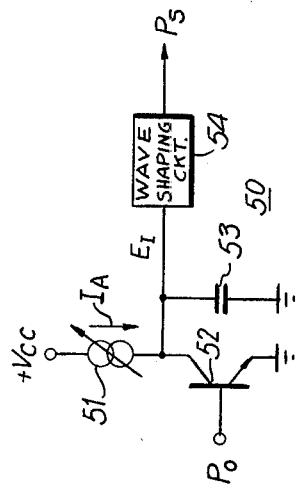
FIG. 4 is a circuit wiring diagram of a phase shifter that may be used in the embodiment of this invention, shown in FIG. 1.

Referring now to FIG. 4, it will be seen that an embodiment of a variable phase shifter 50 that may be employed in the circuit of FIG. 1 includes a variable constant current source 51, which produces a constant current $I_A$, suitably controlled by the output or control voltage from low-pass filter 44 of PLL circuit 40, and which is connected in series with the collector-emitter path of a transistor 52, between a voltage source $+V_{CC}$ and ground. A capacitor 53 is connected in parallel with the collector-emitter path of transistor 52 which is supplied, at its base, with output pulse $P_O$ from VCO 42 of phase-locked loop circuit 40. The voltage $E_I$ (FIG. 7B) developed across capacitor 53 is then supplied to a wave shaping circuit 54 to produce therefrom an output pulse $P_S$ (FIG. 7 C) as the output of phase-shifter 50.

Figures 7A, 7B, 7C, 7D, 7E, 7F, 7G:
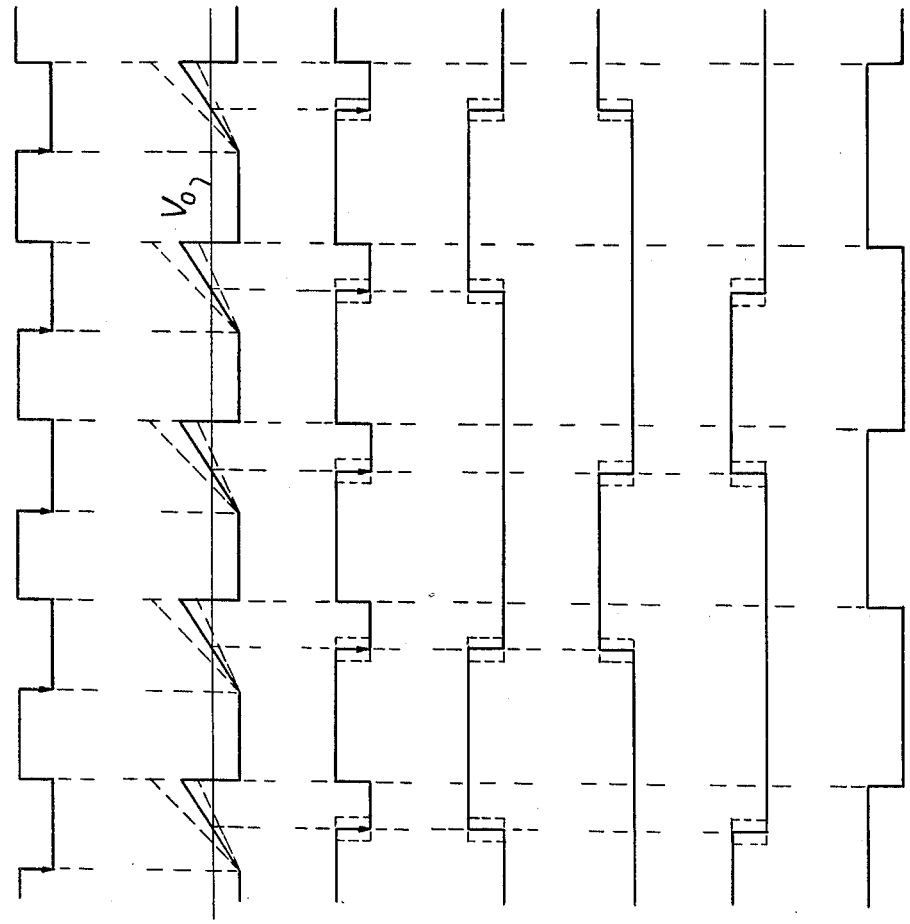
FIGS. 7A–7G are waveform diagrams to which reference will be made in describing the operation of the embodiment shown in FIG. 1.

When output pulse $P_O$ from VCO 42 is at logic level "1" (FIG. 7A) so as to turn transistor 52 ON, the voltage $E_I$ (FIG. 7B) across capacitor 53 is at ground potential. However, when output pulse $P_O$ is at logic level "0" so as to render transistor 52 inoperative, capacitor 53 is charged by the current $I_A$ from constant current source 51, resulting in the voltage $E_I$ across capacitor 53 being increased at a certain rate. When voltage $E_I$ has a value above a threshold level $V_O$ (FIG. 7B) of waveform shaping circuit 54, output pulse $P_S$ (FIG. 7C) from phase-shifter 50 has a logic level value of "0". On the other hand, output pulse $P_S$ takes on a value of logic level "1" when $E_I$ falls below threshold level $V_O$. Consequently, the falling or negative going edge of output pulse $P_S$ is delayed with respect to the falling edge of output pulse $P_O$ from VCO 42, although the rising or positive-going edges thereof coincide. This is particularly significant since gate pulses $P_R$, $P_G$ and $P_B$ from gate pulse generator 60 are produced at the falling edges of output pulse $P_S$, as shown in FIGS. 7D-7F. Thus, for example, if the current $I_A$ from constant current source 51 is increased in proportion to the control voltage from low-pass filter 44, an increase in the control voltage will cause voltage $E_I$ to have a greater slope, thereby advancing the time when output pulse $P_S$ falls off to its logic level "0" value, as indicated by the dashed lines which are to the left of the solid lines on FIG. 7C. Accordingly, this results in gate pulse signals $P_R$, $P_G$ and $P_B$ being advanced in phase in correspondence with such increase in the control voltage.

More particularly, given that the deviation in angular frequency between index signal $S_I$ and a reference signal having an angular frequency $\omega_0$, is $\Delta\omega$, and that the level deviation between the control voltage from low-pass filter 44 and a reference potential Vo is $\Delta V$, it is seen from FIG. 3 that $\Delta V$ is proportional to $\Delta\omega$. It is to be realized, of course, that the angular frequency of the index signal is proportional to the scanning velocity of the electron beam. Accordingly, the level of the control signal from low-pass filter 44 and, in particular, the level deviation $\Delta V$, corresponds to such deviation in angular frequency so that a greater variation in the level of the control signal corresponds to a greater deviation in angular frequency and beam velocity. If it is further given that, as a result of such change in frequency, the response time of photo-detector 20 and band-pass filter 30 is delayed by $\tau 1$ and the response time of PLL circuit 40 is delayed by $\tau 2$, a total phase deviation $\Delta\phi$ between pulse $P_O$ from oscillator 42 and a reference signal having a phase $\phi_0$ can be represented as follows:

$$\Delta\phi = N(\Delta\omega\cdot\tau 1) + (N\cdot\Delta\omega)\tau 2 = N\cdot\Delta\omega(\tau 1 + \tau 2)$$

As shown in FIG. 3, this phase deviation $\Delta\phi$ is also proportional to the deviation in angular frequency $\Delta\omega$ and consequently, to changes in beam velocity.

Accordingly, the phase of output pulse $P_O$ from oscillator 42 is shifted in variable phase shifter 50 in accordance with the output voltage from low-pass filter 44 in a direction opposite to and in an amount corresponding to the phase shift or time delay imparted by photo-detector 20, band-pass filter 30 and PLL circuit 40. Consequently, the electron beam is properly modulated with the color information as it scans the respective color phosphor stripes, regardless of any time delay imparted by the color control circuitry, resulting in no change in hue, and no relative reduction of luminance and color saturation. It is to be noted that, as shown in FIG. 7G, output pulse $P_N$ from frequency divider 43 of PLL circuit 40 is made to reverse, that is, to rise and fall, at the rising edges of successive output pulses $P_O$ from VCO 42. This results in a duty factor of 50% at all times, such that the phase of pulse $P_N$ is not influenced by phase changes of output pulse $P_S$ from variable phase shifter 50.

Figure 2:
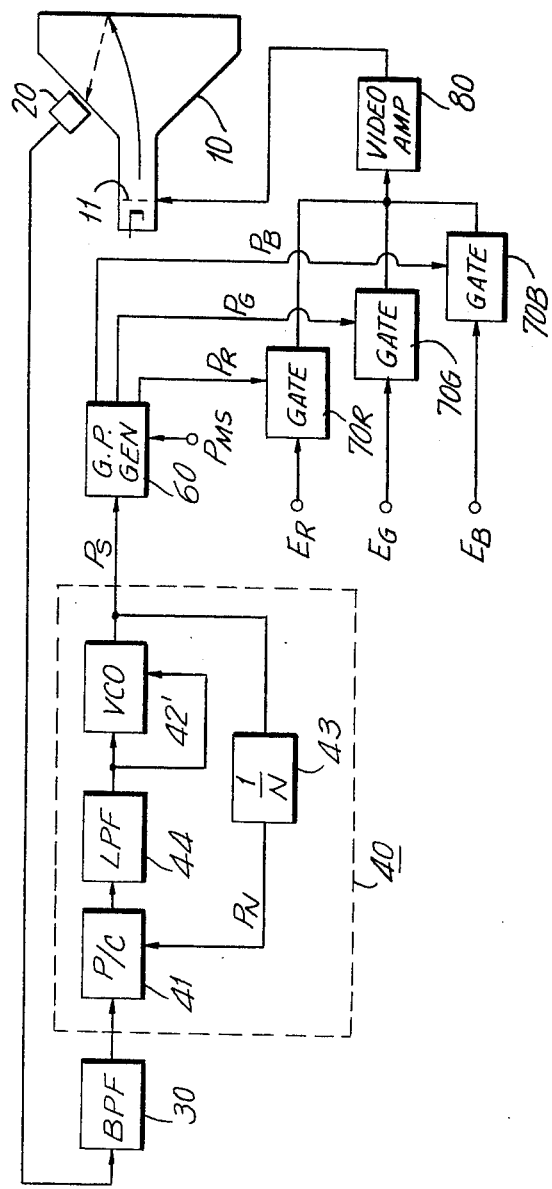
FIG. 2 is a block diagram of a second embodiment of an apparatus according to this invention for controlling color switching in a beam index color television receiver.

Referring now to FIG. 2, it will be seen that, in another embodiment of the invention for controlling the electron beam in a base index color television receiver, elements corresponding to those described above with reference to the apparatus of FIG. 1 are identified by the same reference numerals. In the apparatus of FIG. 2, VCO 42' also performs the phase-shifting function of the omitted phase-shifter 50 of FIG. 1 and delivers output pulse $P_S$ to gating pulse generator 60.

Figure 6:
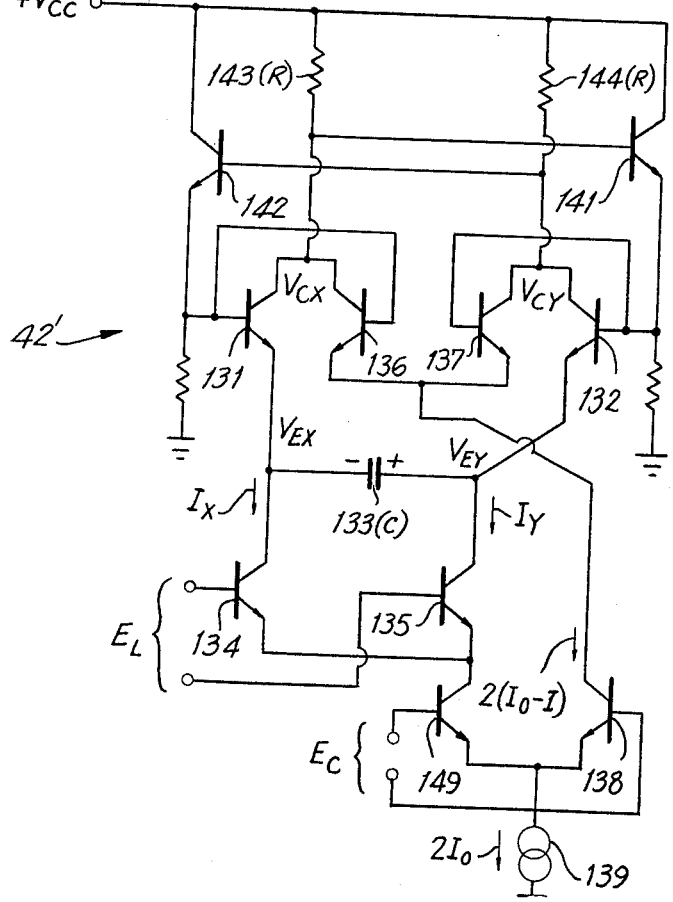
FIG. 6 is a circuit wiring diagram of a voltage-controlled oscillator that may be used in a phase-locked loop circuit of FIG. 2.

As shown in FIG. 6, a voltage-controlled oscillator 42', which can be utilized in the circuit of FIG. 4, is identical to VCO 42 of FIG. 5 with the following exceptions: In VCO 42', the emitters of transistors 134 and 135 are connected to the collector of a transistor 149 which has its collector-emitter path connected in series with the collector-emitter path of transistor 135. The emitters of transistors 149 and 138 are connected together and the junction thereof is connected to constant current source 139. Further, the bases of transistors 134 and 135 are no longer connected together and the control voltage $E_L$ from low-pass filter 44 is supplied between these bases, whereas an output voltage $E_C$ from low-pass filter 44 is supplied between the bases of transistors 149 and 138. Thus, when the voltage $E_C$ supplied from low-pass filter 44 is supplied to transistors 149 and 139 so as to change the ratio of currents through these transistors, the oscillation frequency of VCO 42' can be changed in a manner similar to that previously described in regard to VCO 42 of FIG. 5.

However, in VCO 42', currents $I_X$ and $I_Y$ through transistors 134 and 135, respectively, are no longer equal, although there is a fixed relationship between such currents which is defined by the expression, $I_X + I_Y = 2I$. In other words, although the control voltage signal $E_L$ applied between the bases of transistors 134 and 135 is varied so as to vary the relative ratio of currents $I_X$ and $I_Y$, the sum of these currents is always equal to $2I$. Thus, output pulse $P_S$ (FIG. 9A) from VCO 42' is phase-shifted in a manner similar to that in phase-shifter 50 of FIG. 1. Consequently, gate pulses $P_R$, $P_G$ and $P_B$ (FIGS. 9B, 9C and 9D, respectively) are correspondingly phase-shifted so that the electron beam is properly modulated with the color information as it scans the respective color phosphor stripes, regardless of changes in the control signal level from low-pass filter 44, that is, regardless of any time delay imparted by photodetector 20, filter 30 and PLL 40. Further, it is seen in FIG. 9E that output pulse $P_N$ from frequency divider 43 is reversed, that is, rises and falls at the rising edges of output pulse $P_S$ of VCO 42'. This results in a duty factor of 50% and a frequency divided pulse $P_N$ which does not have its phase affected by the phase change of output pulse $P_S$ of VCO 42'.

It will be appreciated that, although the invention has been described above as being applied to a beam index color cathode ray tube 10 in which the pitch $P_I$ of index elements $I_N$ is two-thirds the pitch $P_T$ of the triads of red, green and blue phosphor stripes R, G and B, the invention can be similarly applied to a beam index color cathode ray tube having other pitch relationships, for example, in which the pitch of the index elements or stripes $I_N$ is equal to that of the triads of red, green and blue color phosphor stripes, or is an integral multiple thereof.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for controlling color switching in a beam index color television receiver of the type including a cathode ray tube with a display screen having beam-excitable color elements to be scanned by an electron beam as the latter is modulated by color control signals, and index elements which are scanned by said beam as the latter scans said display screen, said apparatus comprising:

means for generating an index signal in response to the scanning of said index elements by said beam;

gating means for sequentially switching said color control signals individually for modulating said electron beam as said beam scans the respective ones of said color elements;

means for generating gating pulses in response to said index signal and for supplying said gating pulses to said gating means so as to cause the latter to switch said respective color control signals, said means for generating and supplying gating pulses including controlling oscillator means for producing first pulses at a frequency which is synchronized with the frequency of said index signal in response to a control voltage varying with changes in said frequency of the index signal and which is applied to said oscillator means; and means for shifting the phase of said first pulses in response to variations in said control voltage.

2. Apparatus according to claim 1; in which said means for generating and supplying gating pulses includes phase-locked loop means for producing said first pulses at a frequency synchronized with the frequency of said index signal, and means for sequentially supplying said gating pulses to said gating means to cause the latter to gate said respective color control signals.

3. Apparatus according to claim 2; in which said phase-locked loop means includes said controllable oscillator means and a filter means supplying said control voltage to said controllable oscillator means for controlling the production of said first pulses therefrom.

4. Apparatus according to claim 3; in which said means for shifting the phase includes a variable phase-shifter apart from said controllable oscillator means for phase-shifting said first pulses, and said filter means also supplies said control voltage to said variable phase-shifter for controlling the amount of phase shift imparted thereby.

5. Apparatus according to claim 4; in which said phase-shifter includes a transistor having an input electrode receiving said first pulses from said controllable oscillator means and having an emitter-collector path, a variable current source connected in series with said path between a voltage source and ground, a capacitor connected in parallel with said emitter-collector path, and a wave-shaping circuit connected to said capacitor for producing said phase-shifted pulses, said variable current source being responsive to the level of said control voltage from said filter means.

6. Apparatus according to claim 1; in which said index elements are excited so as to emit light as they are scanned by said electron beam, and in which said means for generating an index signal includes a photo-detector receiving said emitted light from said index elements to produce a periodic signal having a frequency equal to the frequency at which the index elements are excited, and a filter receiving said periodic signal for supplying said index signal to said means for generating and supplying gating pulses.

7. Apparatus according to claim 1; in which said gating means includes a plurality of gates each supplied with a respective series of said gating pulses and a respective one of said color control signals, for supplying said color control signals individually to modulate said electron beam when a respective gating pulse and color control signal are both applied to the corresponding gates.

8. Apparatus according to claim 1; in which said means for shifting is included with said controllable oscillator means for phase-shifting said first pulses produced thereby, said oscillator means has two inputs, and said control voltage from said filter means is applied to one of said inputs for controlling the frequency of production of said first pulses and applied to the other of said inputs for controlling the amount of phase shift imparted to said first pulses by said oscillator means.

9. Apparatus according to claim 1; in which said controllable oscillator means includes a pair of emitter-coupled multivibrators, each having a pair of transistors with their bases and collectors connected together, the emitters from one transistor of each pair being connected together, and a capacitor connecting together the emitters from the other transistor of each pair.

10. Apparatus according to claim 9; in which said controllable oscillator means further includes a variable current source, a fifth transistor which has its emitter connected to said variable current source, the emitters from said one transistor of each pair being connected to said fifth transistor, and sixth and seventh transistors connected to said emitters of said other transistor of each pair, respectively.

11. Apparatus according to claim 10; in which the emitters of said fifth, sixth and seventh transistors are connected together, said sixth and seventh transistors have a common base, and said control voltage is supplied between the base of said fifth transistor and said common base.

12. Apparatus according to claim 10; in which said oscillator means further includes an eighth transistor, the emitters of said sixth and seventh transistors are connected to said variable current source through the collector-emitter path of said eighth transistor, said means for shifting is included with oscillator means for phase-shifting said first pulses produced thereby, said control voltage is applied between the bases of said fifth and eighth transistors for controlling the production of said first pulses from said oscillator means and said control voltage is also applied between the bases of said sixth and seventh transistors for controlling the amount of phase shift imparted to said first pulses by said oscillator means.

* * * * *